Patented May 9, 1950

2,507,084

UNITED STATES PATENT OFFICE 2,507,084

SPICE PRODUCT AND METHOD OF MAKING THE SAME

Harry R. Ansel, Oak Park, Ill., assignor to Wm. J. Stange Co., Chicago, Ill., a corporation of Illinois No Drawing. Application April 28, 1948, Serial No. 23,870

6 Claims. (Cl. 99—140)

1

My invention contemplates and has for its objects the provision of a new spice product and a satisfactory method for its manufacture. Such new spice product may be made from any oleoresin-containing natural spice such as, for example, black pepper, white pepper, cinnamon, celery or sage but presently is in greatest demand when made from black pepper.

A salient feature of such new spice product is that it need not and desirably should not contain any substance foreign to its basic natural spice.

Another salient feature of such new spice product is that it need not and desirably should not be any less effective as a condiment than is its basic natural spice when correspondingly finely divided, despite that the new spice product may be and desirably does contain a substantially less percentage of oleoresin than does the natural spice from which is is derived.

From the standpoint of the ultimate consumer, such new spice product is a very desirable condiment because it does not, as do ordinary ground spices, carry into the digestive tract, possibly to irritate its walls and impair its functioning, pungent and/or aromatic spice constituents which are unreleased from the spice fibers in which they are naturally locked and therefore are incapable of having any appreciable condimentary effect while in the mouth.

From the standpoint of the manufacturer, such new spice product has the important incidental advantage that its manufacture affords, as a valuable by-product, oleoresin that may be incorporated in a variety of seasoning materials.

Other objects, features and advantages of my invention will hereinafter appear.

In manufacturing my new spice product, a selected oleoresin-containing natural spice, e. g., black pepper, is ground to a fineness suitable for percolation. The extremely fine particles of the ground spice, which may amount to from about 3% to about 5% of the whole, desirably are removed, as by sifting, and discarded. All oleoresin is extracted, e. g., as by conventional percolating procedure, from all of the particles of the ground spice not previously discarded as undesirably fine. The spent spice (i. e., the fibrous material from which the oleoresin has been removed) is thoroughly dried to remove therefrom every trace of solvent. Water is added to the spent spice particles—the added water desirably being sufficient or slightly more than sufficient to reconstitute the natural or original water content of the spice particles under treatment. The moistened particles of the spent spice are now surface-coated with a suitable percentage, e. g., substantially 50%, of the oleoresin previously extracted from such particles (or, alternatively and equivalently, are surface-coated with a quantity, equal to said suitable percentage, of the same kind of oleoresin that previously was extracted from such particles). The surface-coating of the moistened particles of the spent spice with the oleoresin desirably is effected in a power mixer of suitable capacity and design.

The discarding of the very fine particles of the ground natural spice before extraction of the oleoresin is an optional but desirable step in the method of producing my new spice product. That the original water content of the particles of the spent spice be restored, in at least some degree, before those particles are given their oleoresin coatings, is particularly desirable. Although I realize that the oleoresin coatings may be applied to somewhat arid particles of spent spice, I do not recommend that practice.

The resultant spice product includes no substance foreign to the basic natural spice from which it was manufactured. It consists of particles of spice fiber from the interiors of which all or substantially all of the pungent and aromatic constituents of the spice have been released, and which particles carry as coatings on their outer surfaces oleoresin of the kind native to those particles in amounts sufficiently less than the amounts of such oleoresin originally contained by those particles. The reconstituted water content of its fiber particles tends to keep the oleoresin of their surface coatings from moving to the interiors of the particles. It is a spice product which has been definitely improved, for every condimentary purpose, by the removal of a substantial percentage of the oleoresin which characterizes it.

As manufactured from black pepper berries, the new spice product of my present invention has been carefully compared with ordinary ground black pepper. It has been found that any given quantity of the new spice product, when added to soups, gravies or other cooked foods, has at least as much or more condimentary effect in the mouth of a person eating the food as does an equal quantity of ordinary ground black pepper,—notwithstanding that the ordinary ground black pepper, as compared with the new product, contains in double quantity the oleoresin which gives pepper its condimentary value. This is explainable by the fact that it requires about ten hours of solvent extraction, using fresh solvent during the extraction process, to evacuate all oleoresin of black pepper from the microscopic cells in which nature has deposited it. Ground natural black pepper cooked in foods never completely yields up its pungent and aromatic constituents,—only a partial extraction of those constituents ever being available for detection by the sensory nerves of taste and smell when cooked foods containing ordinary ground black pepper are being eaten.

A user of my new spice product, whether it be manufactured from black pepper berries or other oleoresin-containing spice, advisedly and naturally will so apply it to a food as to add to that food only the quantity of released and exposed oleoresin—being the only oleoresin contained in such new spice product—that will afford the desired condimentary effect while in the mouth of an eater of the food. Therefore, when the food is swallowed and exposed to the digestive juices, no oleoresin, in excess of that which was appreciated by the senses of taste and smell while in the mouth, can be extracted from the food during the course of digestion. The opposite is true when a food seasoned with a ground natural oleoresin-containing spice is swallowed, i. e., the digestive juices are able to extract from the food, during the process of digestion and throughout the digestive tract, oleoresin substantially in excess of that which had appreciable condimentary effect in the mouth, such excess oleoresin tending to cause inflammation of the walls of the digestive tract and to impair the processes of digestion. Such deleterious effect of excess oleoresin in natural spices is recognized by the medical profession when it eliminates spices from special diets prescribed for patients suffering from ailments of the alimentary tract.

Having thus described my invention, what I claim as new and desire to secure by Letters Patent of the United States is:

1. In a composition of the class described, natural spice fiber particles which interiorly are water laden and substantially devoid of oleoresin and which exteriorly are coated with oleoresin identical in kind with, and in quantity substantially less than, the aggregate of the quanta of oleoresin naturally occurring in such particles.

2. A composition as specified in claim 1 wherein the spice fiber particles are those of black pepper.

3. In a composition of the class described, natural spice fiber particles which contain quanta of water not substantially less than their natural content of water and which interiorly are substantially devoid of oleoresin and which are substantially uniformly exteriorly coated with a spice oleoresin natural thereto in an amount that is substantially less than the aggregate of the quanta of oleoresin naturally occurring in such particles.

4. A composition as specified in claim 3 wherein the spice oleoresin which coats the exteriors of the spice fiber particles is the oleoresin of black pepper.

5. The method which consists in extracting substantially all oleoresin from particles of the fiber of a natural spice, causing the interiors of said particles to become water laden, and substantially uniformly coating the exteriors of such particles with a spice oleoresin natural thereto whilst the interiors of the particles remain water laden.

6. The method which consists in extracting substantially all oleoresin from particles of the fiber of a natural spice, causing the interiors of said particles to become laden with water wherewith the hereinafter mentioned oleoresin is immiscible, and then substantially uniformly coating the exteriors of said particles with a spice oleoresin natural thereto whilst the interiors of the particles remain laden with the water.

HARRY R. ANSEL.

REFERENCES CITED

The following references are of record in the file of this patent:

UNITED STATES PATENTS

| Number | Name | Date |
|---|---|---|
| 2,384,532 | Bush et al. | Sept. 11, 1945 |